Dec. 1, 1959  R. E. OCHS, JR  2,915,078
FLAPPER NOZZLE COMBINATION WITH
A VARIABLE NOZZLE RESTRICTION
Filed Oct. 17, 1956
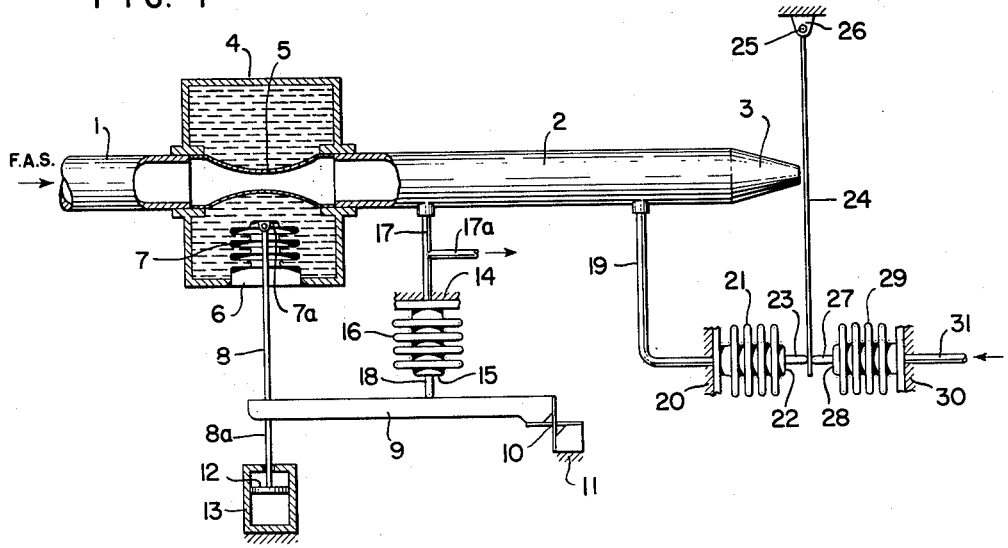
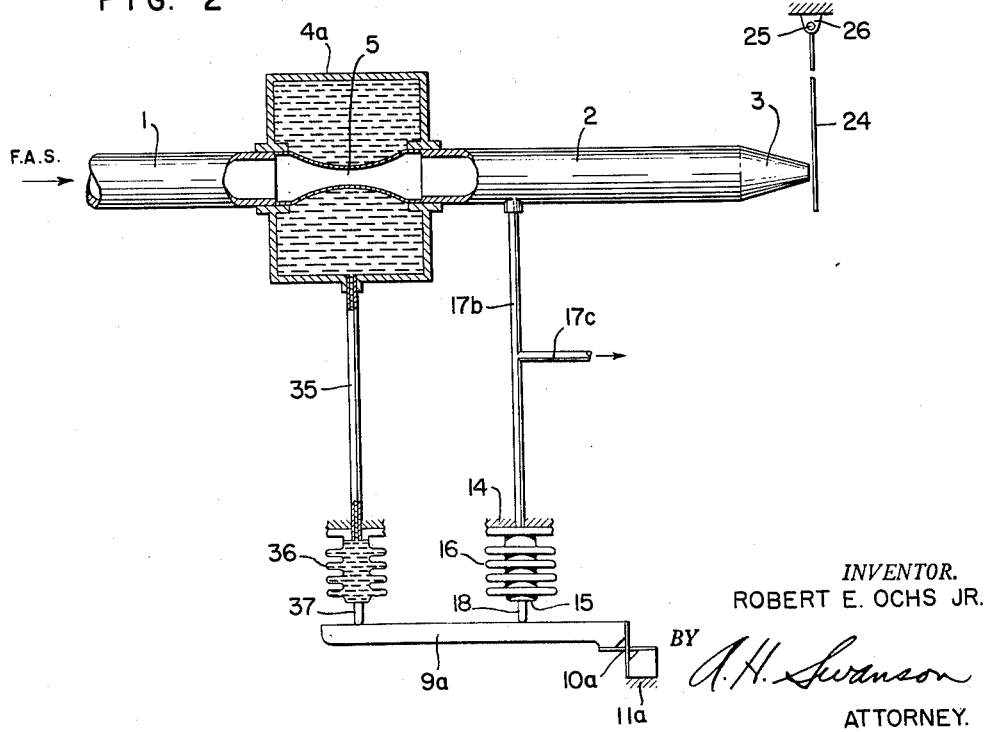
INVENTOR.
ROBERT E. OCHS JR.
BY
*A. H. Swanson*
ATTORNEY.

United States Patent Office 2,915,078
Patented Dec. 1, 1959

2,915,078

FLAPPER NOZZLE COMBINATION WITH A VARIABLE NOZZLE RESTRICTION

Robert E. Ochs, Jr., Oreland, Pa., assignor to Minneapolis-Honeywell Regulator Company, Minneapolis, Minn., a corporation of Delaware Application October 17, 1956, Serial No. 616,515

10 Claims. (Cl. 137—85)

The present invention comprises novel means for regulating the flow of air or other fluid through a conduit. More specifically, the invention comprises a conduit receiving air or other fluid at an inlet end and discharging fluid at an outlet or nozzle chamber end spaced away from said inlet end, and including means intermediate said ends for variably restricting and regulating the fluid flow through the conduit.

In a preferred form of the invention, rigid tubular end section portions of said conduit are connected by a tubular body having a flexible annular inner wall smaller in its internal diameter than said rigid sections. Advantageously, the discharge end of the conduit is a nozzle that is variably throttled by a flapper that is moved toward or away from the nozzle in accordance with changes in the magnitude of a variable. In a preferred construction, an intermediate portion of the conduit is surrounded by an annular member having a rigid outer wall larger in diameter than said tubular body, and having a flexible inner wall with an internal diameter smaller than the diameter of the tube.

In one desirable embodiment of the invention, a bellows forms a flexible closure for a portion of the outer rigid wall of the metallic tubular section that is between the tubular inlet and outlet end portions of the conduit. This bellows extends into the space between the aforementioned rigid outer annular wall portion and the flexible inner annular wall portion that forms a restriction.

In the aforementioned preferred form of the invention, the fluid passing through the conduit is discharged to atmospheric pressure through a nozzle. A flapper that is transverse to the nozzle is movable toward and away from the nozzle depending on whether the magnitude of a variable to be measured is increasing or decreasing. As the flapper is moved toward or away from the nozzle the pressure inside the nozzle is respectively either increased or decreased and this increase or decrease is in turn used to permit an increasing or decreasing pressure signal to flow into the nozzle chamber and through an output pressure transmission line.

A more specific object of the present invention is thus to disclose a variable restricting apparatus that will cause the flow of a supply fluid passing into a nozzle chamber to increase whenever the flapper action noted supra has caused an increase in the pressure in the nozzle chamber to occur or to cause a decrease when such a flapper action has caused a decrease in the pressure in nozzle chamber to occur.

Another object of the invention is to provide a variable restricting apparatus that is particularly useful in control applications in which large changes in output pressure are desired for minute changes in position of a flapper in a flapper-nozzle type bleed valve.

A better understanding of the present invention may be had from the following detailed description when read in connection with the accompanying drawings, in which:

Fig. 1 is a diagrammatic plan view partly in section of one desirable embodiment of the present invention; and Fig. 2 illustrates a modification of the apparatus shown in Fig. 1.

The embodiment of the invention illustrated in Fig. 1 comprises a conduit inlet tube 1, conduit outlet tube 2, a tapered outlet nozzle 3, and a tubular member 4 connecting the adjacent end portions of the tubes 1 and 2. The tubular member 4 has a rigid outer wall surrounding a flexible inner wall 5. As shown, the tubular body 4 includes a flexible tubular wall 5 shown as decreasing in diameter from the ends of the member 4 to the center of the inner wall 5. As shown, the outer wall of the member 4 is formed with a central opening 6 having its axis transverse to the central portion of the inner wall 5. The opening 6 is surrounded by a flexible tubular element 7 having its outer end rigidly connected to the surrounding portion of the wall 4. The inner end of the tubular element 7 is connected to a transverse disc 7a which closes the space surrounded by the tubular element 7. The tubular element 7 is adapted to contract and expand as the pressure of the fluid in the member 4 increases and decreases.

The tubular wall 7 and end wall 7a form a closure for the wall opening 6. As shown, the inner end of the tubular wall 7 is connected by a rod 8 to a lever element 9 which may be approximately parallel to the inlet and outlet tube members 1 and 2. The end of the lever 9 remote from the rod 8 is connected as by a pivotal element 10 to a stationary support 11. A lower extension 8a of the rod 8 is shown as extending from the lever 9 and into engagement with a transverse disc 12. The disc 12 extends into a liquid filled dash pot 13 which is open at its upper end. The end of the bar 9 remote from the elements 10 and 11 tends to move the rod 8 toward or away from the common axis of the tube sections 1 and 2 as the pressure within said nozzle chamber 2 increases or decreases.

The bellows element end walls 14 and 15 shown in Fig. 1 are connected by a bellows element 16. The bellows end wall 14 communicates with the tube 2 through a port 17. The lower end of the bellows element 16 is connected by a central pivotal extension 18 of the bellows wall 15 to a portion of the bar 9 intermediate the ends of the latter. As will be apparent, an increase or decrease in the pressure within the tube 2, due to the flapper moving away from or closer to the nozzle, tends to respectively decrease or increase the length of the bellows element 16. If the flapper is being moved away from the nozzle 3 and the pressure in the nozzle is decreased the bellows 16 will tend to move toward a collapsed position and thus cause the bar 9 and rod 8 to be moved in an upward direction to that shown in the drawing. When this occurs the fluid between the member 4 and the restriction wall will be compressed and the size of the restriction 5 reduced. Reducing the diameter of the restriction in this manner thus permits less fluid to flow from the air supply conduit 1 to the nozzle chamber 2. In a similar but opposite manner when the flapper 24 is being moved toward the nozzle 3 the diameter of the restriction 5 is permitted to open larger than that shown by the force of the supply fluid flow and thus allow a greater amount of fluid to flow through the conduit 1 from a supply source not shown to the nozzle chamber 2.

As the pressure is built up in the nozzle chamber 2 by the aforementioned movement of the flapper toward the nozzle, this nozzle chamber pressure is transmitted by way of conduit 17 not only to the bellows 16 but also to an output transmission conduit 17a. It is thus evident by the aforementioned description of the restricting apparatus that a very large increase in the fluid pressure flowing through the transmission conduit 17a will occur whenever the flapper is moved toward the nozzle. It is further evident that a very large decrease in the fluid pressure in conduit 17a will occur whenever the flapper is moved away from the nozzle.

The unattached end of the transmission conduit 17a may be operably connected through a long length transmission line to a receiving instrument that is remotely located from the flow regulating means shown in Fig. 1 of the drawing.

The automatically varied restricting means shown in Fig. 1 thus provides a way of increasing the pressure that is being transmitted by a flapper-nozzle valve and is particularly useful in transmitting apparatus in which a variable input force that is applied to a flapper only produces a very small amount of flapper motion. Without the variable restricting means being used in the aforementioned apparatus it would be very difficult to obtain a high enough change in pressure signal in the nozzle chamber to distinguish when small incremental movements in the flapper have occurred.

A conduit 19 connects the tube 2 to a bellows element including parts 20, 21, and 22 respectively similar to the previously mentioned parts 14, 15, and 16. The movable end wall 22 is connected by a rod 23 to the unattached movable end of a flapper 24. With this arrangement changes in pressure occurring in tube 2 may be used to reposition the flapper in a force balanced manner. The flapper 24 is transverse to the nozzle element 3 and has an intermediate portion transverse to and adjacent the tube end 3. The end 25 of the flapper 24 remote from the rod 23 has its end connected to a stationary pivot 26. As shown, the movable end of the flapper 24 is interposed between parts 23 and 27. The part 27 is connected to the movable end 28 of a bellows 29 which has a stationary end 30. A variable input fluid pressure is supplied to the bellows element 29 through a conduit 31 which acts to apply a force to the flapper 24 in accordance with magnitude of a variable. As the magnitude of this variable is increased the flapper will be moved closer to the nozzle and if the magnitude of the variable is decreased the flapper will be moved further away from the nozzle. As shown, the parts 28–31 are analogous to the previously mentioned parts 19, 20, 21, and 22.

A modified form of the apparatus from that shown in Fig. 1 is illustrated in Fig. 2. The apparatus shown in Fig. 2 includes elements 9a, 10a and 11a, 17b, 17c which are similar to elements 9, 10, 11, 17 and 17a of Fig. 1 and other elements 4, 15, 16 which are identical to the elements represented by these same reference numerals in Fig. 1.

A main distinction between the particular constructions shown in Figs. 1 and 2 is the elimination of the elements 6, 7, and 7a shown in Fig. 1, and the replacement of the rod 8 of Fig. 1 by a conduit member 35. The latter connects the tubular element 4a to a tubular bellows element 36. The element 4a differs from the element 4 of Fig. 1 in its omission of the parts 6, 7, 7a, and 8, and in the replacement of the rod or bar 8 of Fig. 1 by a fluid damping tube 35 connecting the interior of the chamber 4a to the stationary upper end of a bellows element 36.

Fig. 2 also shows the movable lower end portion of the bellows element 36 connected by a rod 37 to the end of the beam 9a remote from the pivot element 10a.

When an increase in pressure in the nozzle chamber 2 of Fig. 2 occurs the beam 9a will move in a downward direction and in so doing permit the bellows 36 to be forced downwardly into an expanded position from the position shown in Fig. 2. This action will cause a portion of the fluid fill between elements 4a and 5 to be forced through a fluid dampening pipe 35 into the bellows 35 by the fluid air supply that is flowing through the conduit portion 1, the restriction 5 and out of the nozzle chamber 2. This action will thus permit a greater air supply to flow through the restriction into the nozzle chamber 2 from conduit 1 as less resistance will then be offered by the fluid surrounding the restriction. On the other hand, if a greater flow of fluid flows into the portion of the restriction between the 4a and 5 as is the case when the flapper 24 is moving away from the nozzle 3 the diameter of the wall 5 will be reduced and less fluid will be permitted to flow from the supply inlet conduit portion 1 through the restriction 5 to nozzle chamber 2.

In the construction shown in Fig. 2, the upper end 25 of the flapper 24 is connected by way of a stationary pivot element 26 as it is in Fig. 1.

It should be further noted that the conduit 17b shown in Fig. 2, that is similar to the conduit 17 shown in Fig. 1, will transmit any high gain fluid pressure changes that occur in the nozzle chamber 2 to not only the bellows 16 but also transmit such a high gain pressure through the transmission conduit 17c to a remotely located receiving instrument. While not shown in Fig. 2, the flapper 24 may be caused to move toward and away from the nozzle by employing the same type of flapper actuating means as that shown to the right of the flapper in Fig. 1. The flapper 24 shown in Fig. 2 may also be provided with an apparatus that will force balance the beam such as the apparatus shown immediately to the left of the flapper 24 in Fig. 1.

One of the salient features of the high gain flapper described in this application is that a variable restriction in a fluid supply pressure conduit is used to automatically permit the pressure being transmitted from a nozzle chamber to be greatly increased or decreased depending on whether a variable force is acting to minutely move the flapper toward or away from a bleed nozzle.

What is claimed is:

1. A high gain fluid pressure transmitter comprising, a regulatable fluid supply pressure transmitting conduit having a flexible fluid pressure actuated restriction, a bleed nozzle attached to one end of said conduit adjacent said restriction, a flapper means minutely spaced from and directly positioned in front of the face of said nozzle, a means for minutely moving the flapper towards said nozzle when a variable to be determined is of an increasing magnitude and subjecting the flapper to a movement that is away from said nozzle when the variable is of a decreasing magnitude, fluid pressure actuating means operably connected to the pressure in the portion of said conduit between its restriction and nozzle at one end and to said flexible restriction at the other end to provide a means of changing a supply of fluid flowing through said restriction, said first mentioned movement of said flapper acting to increase the said fluid pressure that is present in said nozzle and to cause said pressure actuating means to regulatably adjust said restriction to a position in which it will permit a greater supply of fluid to flow to said nozzle chamber and said second mentioned movement of said flapper acting to cause said pressure actuating means to close said restriction and reduce the flow of fluid flowing into said nozzle chamber and a conduit means for transmitting said fluid pressure changes in said nozzle chamber to a remotely located receiving means.

2. A telemetering system for transmitting a fluid pressure signal through a conduit comprising a transmitting conduit for transmitting a regulatable fluid pressure to and through an exhaust port in a bleed valve chamber, a transducer for minutely increasing said exhaust port opening toward its wide open position at a rate that is proportional to the rate of increase in the magnitude of a variable and decreasing said exhaust port opening toward its closed position at a rate that is proportional to the rate of decrease in the magnitude of said variable, a regulatable restriction in said transmitting conduit adjacent said chamber and means operably connected to the pressure in said bleed valve chamber and to said restriction for increasing or decreasing said fluid flow opening of said restriction in accordance with changes in pressure occurring in said chamber and a conduit connected to said chamber for transmitting said changes in fluid pressure in said bleed valve chamber due to changes in the size of the said exhaust port opening and the restriction to a remotely located receiving means.

3. A high gain fluid pressure apparatus comprising, a regulatable fluid supply pressure conduit having a flexible fluid pressure actuated restriction, a bleed nozzle attached to one end of said conduit adjacent said restriction, a flapper means minutely spaced from and directly positioned in front of the face of said nozzle, a means for minutely moving the flapper towards said nozzle when a variable to be determined is of an increasing magnitude and subjecting the flapper to a movement that is away from said nozzle when the variable is of a decreasing magnitude, fluid pressure actuating means operably connected to the pressure in the portion of said conduit between its restriction and nozzle at one end and to said flexible restriction at the other end to provide a means of changing a supply of fluid flowing through said restriction, said first mentioned movement of said flapper acting to increase the said fluid pressure that is present in said nozzle and to cause said pressure actuating means to regulatably adjust said restriction to a position in which it will permit a greater supply of fluid to flow to said nozzle chamber, said second mentioned movement of said flapper acting to cause said pressure actuating means to close said restriction and reduce the flow of fluid flowing into said nozzle chamber, and a utilization conduit to which said fluid pressure changes in said nozzle are applied.

4. A fluid pressure apparatus comprising, a conduit to transmit a regulatable fluid pressure to and through a nozzle, a flapper positioned adjacent said nozzle, a transducer for minutely moving said flapper toward said nozzle at a rate that is proportional to the rate of increase in the magnitude of a variable and moving said flapper away from said nozzle at a rate that is proportional to the rate of decrease in the magnitude of said variable, a regulatable restriction in said conduit adjacent said nozzle and means operably connected to the pressure in said chamber and to said restriction for increasing or decreasing said fluid flow opening of said restriction in accordance with changes in pressure occurring in said chamber and a utilization conduit to which said fluid pressure changes are applied.

5. A fluid pressure apparatus comprising, a conduit to transmit a regulatable fluid pressure to and through an exhaust port in a bleed valve chamber, a transducer for minutely increasing said exhaust port opening toward its wide open position at a rate that is proportional to the rate of increase in the magnitude of a variable and decreasing said exhaust port opening toward its closed position at a rate that is proportional to the rate of decrease in the magnitude of said variable, a regulatable restriction in said conduit adjacent said chamber and means operably connected to the pressure in said bleed valve chamber and to said restriction for increasing or decreasing said fluid flow opening of said restriction in accordance with changes in pressure occurring in said chamber and a utilization conduit to which said fluid pressure changes are applied.

6. A high gain fluid pressure apparatus, comprising a means to regulate the flow of a fluid supply pressure being transmitted through a conduit having a spaced apart inlet and an atmospheric exhaust bleed nozzle outlet, a flexible element forming a portion of said conduit between said inlet and outlet, a stationary fluid filled chamber surrounding said flexible element, a flexible closure forming a depressed portion in a portion of the wall of said chamber and an apparatus operably connected to said fluid supply pressure in said nozzle chamber at one end and to said closure at its other end to cause said closure to be moved inwardly from or outwardly toward said wall of said chamber when a flapper which is positioned adjacent said nozzle is moved away from or toward said nozzle.

7. A high gain fluid pressure apparatus, comprising means to regulate the flow of a fluid supply pressure being transmitted through a conduit having a spaced apart inlet and an atmospheric exhaust bleed nozzle, a flapper operably positioned immediately in front of said nozzle for minute movement toward and away from said nozzle, a flexible element forming a portion between said inlet and outlet, a stationary chamber containing a fluid surrounding said flexible element, and a response means operably connected to said chamber to vary the force that said fluid in said chamber applies to said flexible element in accordance with said minute movements of said flapper.

8. A high gain fluid pressure apparatus, comprising a means to regulate the flow of a supply pressure being transmitted through a conduit having a spaced apart inlet and an atmospheric bleed nozzle outlet, a fluid filled chamber having a stationary outer wall portion surrounding a portion of said conduit, a flexible tubular portion in said chamber, forming a central passageway between said inlet and outlet, a flexible closure forming a depressed portion in said outer wall of said chamber and a pressure response means operably connected to said fluid pressure in said nozzle and said flexible closure to move said closure away from or toward said stationary outer wall portion in response to changes in the magnitude of said nozzle pressure to thereby increase or decrease the pressure of the fluid within the confines of said stationary outer wall of said chamber and said flexible wall portion that is in contact with said tubular portion.

9. A telemetering system for transmitting a fluid pressure signal through a conduit, comprising a conduit to transmit a regulable fluid supply pressure to and through a nozzle, a flapper positioned adjacent said nozzle, a transducer to minutely move said flapper toward said nozzle at a rate that is proportional to the rate of increase in the magnitude of a variable and to move said flapper away from said nozzle at a rate that is proportional to the rate of decrease in the magnitude of said variable, a regulable restriction in said fluid supply transmitting conduit adjacent and spaced from said nozzle and a pressure responsive means operably connected at one end to the pressure in a portion of said transmitting conduit that is between said restriction and said nozzle and at its other end to vary the magnitude of a fluid pressure that is being applied to the external wall of said restriction to increase or decrease said fluid flow opening of said restriction in accordance with changes in pressure occurring in said conduit portion and a conduit connected to said last mentioned means for transmitting the changes occurring in the fluid pressure in said conduit portion to a remotely located receiving means.

10. A high gain pressure apparatus, comprising a bleed valve chamber, a first means to supply a regulable fluid supply pressure through a flexible restriction to said chamber, a flapper means for altering the pressure bled from said chamber in accordance with the magnitude of a variable and a third means connected to and actuated by the magnitude of the pressure in said chamber at one of its ends and operably connected at its other end to increase the cross-sectional fluid flow area of said restriction during an increase in the magnitude of the pressure in said chamber and to decrease the cross-sectional fluid flow area of said restriction during a decrease in the magnitude of the pressure of said chamber.

(References on following page)

References Cited in the file of this patent

UNITED STATES PATENTS

| | | |
|---|---|---|
| 2,264,261 | Erbguth | Nov. 25, 1941 |
| 2,331,291 | Annin | Oct. 12, 1943 |
| 2,517,820 | Aagaard | Aug. 8, 1950 |
| 2,588,621 | Eckman | Mar. 11, 1952 |
| 2,601,867 | Alyea | July 1, 1952 |
| 2,627,874 | Johnson | Feb. 10, 1953 |
| 2,734,526 | Aagaard | Feb. 14, 1956 |
| 2,735,642 | Norman | Feb. 21, 1956 |
| 2,760,436 | Von Seggern | Aug. 28, 1956 |
| 2,851,230 | Greenland | Sept. 9, 1958 |

FOREIGN PATENTS

| | | |
|---|---|---|
| 1,008,484 | France | Mar. 19, 1952 |
| 1,014,043 | France | Mar. 21, 1952 |